United States Patent [19]

Merlo et al.

[11] 4,263,204

[45] Apr. 21, 1981

[54] MONOAZOIC HYDROSOLUBLE CATIONIC DYES

[75] Inventors: Fabrizio Merlo, Saronno; Ruggero Battisti, Novara; Giorgio Bornengo, Novara; Nicola Mazzaferro, Novara; Angelo Mangini; Antonio Tundo, both of Bologna, all of Italy

[73] Assignee: Montedison S.p.A., Milan, Italy

[21] Appl. No.: 964,162

[22] Filed: Nov. 28, 1978

[30] Foreign Application Priority Data

Nov. 29, 1977 [IT]  Italy .............................. 30140 A/77

[51] Int. Cl.$^3$ ....................... C09B 45/00; C09B 29/22
[52] U.S. Cl. ..................................... 260/147; 260/156
[58] Field of Search ................................ 260/147, 156

[56] References Cited

U.S. PATENT DOCUMENTS

| | | | |
|---|---|---|---|
| 3,657,213 | 4/1972 | Ramanathan ...................... | 260/156 |
| 3,843,622 | 10/1974 | Ramanathan et al. ............... | 260/147 |
| 4,032,532 | 6/1977 | Burkhard et al. .................... | 260/156 |

*Primary Examiner*—John F. Niebling

[57] ABSTRACT

A new class of hydrosoluble monoazoic cationic dyes free of sulphonic or carboxylic groups and derived from 1-phenyl-3-aminopyrazoles is disclosed, as are, also, processes for preparing the new dyes and use thereof in the dyeing and printing of synthetic fibers.

2 Claims, No Drawings

MONOAZOIC HYDROSOLUBLE CATIONIC DYES

THE PRIOR ART

Applicants are not aware of any prior art disclosing the dyes of this invention.

THE PRESENT INVENTION

An object of this invention is to provide a new class of hydrosoluble monoazoic cationic dyes free of sulphonic or carboxylic groups and derived from 1-phenyl-3-aminopyrazoles and which are suitable for dyeing and printing synthetic fibers, including fibers of polyesters and of polyamides modified by acid groups, but particularly fibers of acrylonitrile polymers and copolymers.

This and other objects are achieved by the invention which provides dyes of the class specified and which have the general formula (I):

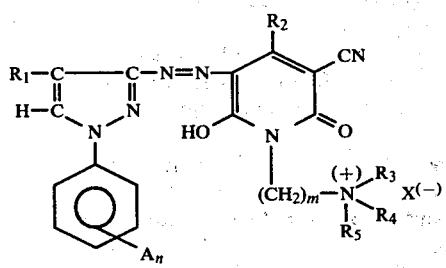

in which
$R_1$ is H or $CH_3$;
$R_2$ is $CH_3$ or $C_2H_5$;
$R_3$ and $R_4$ are $CH_3$ or $C_2H_5$;
$R_5$ is $CH_3$, $C_2H_5$ or $C_6H_5CH_2$;
A is H, Cl, Br, alkyl and alkoxyl groups having up to 2 carbon atoms or $CF_3$;
m is a whole number from 1 to 4;
n is a whole number from 1 to 3;
X is a monovalent anion.

The present invention concerns, moreover, the preparation of the dyes of formula (I) and their use.

When the dyes of formula (I) are applied to fibers of polyesters, of polyamides modified by acid groups, and particularly to fibers of acrylonitrile homopolymers and copolymers, according to the usual dyeing methods, they give on said materials pure and bright dyeings of a yellow hue which possess excellent fastness properties, especially fastness to light.

The dyes of formula (I) are obtained by diazotizing 1-phenyl-3-amino-pyrazoles of formula (II):

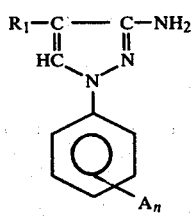

and by the successive coupling in a substantially neutral aqueous medium, which may be slightly acid or slightly alkaline, with alkylated pyridones of formula (III):

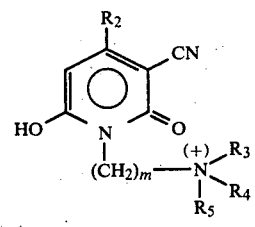

Advantageous results are obtained using pH values of around 6.

Alternatively, the alkylation may follow the coupling of the diazoderivative of the compound of formula (II) with the compound of formula (V), as described infra.

In other words, the dyes of this invention can be obtained by alkylating the intermediate compound of formula (IV):

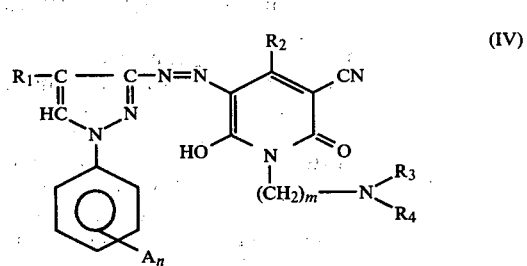

in inert organic solvents.

In formulae (II), (III) and (IV), the symbols $R_1$-$R_5$, A, m and n have the same significance as in general formula (I).

The intermediates of formula (IV) are new compounds in the art and within the scope of this invention.

However, the 1-phenyl-3-aminopyrazoles of formula (II) are known products and can be obtained by the known processes for preparing them. For instance, when $R_1$ is H and A is H, the aminopyrazoles of formula (II) can be obtained by condensation of phenylhydrazines with acrylonitrile resulting in 1-phenyl-3-aminopyrazoline which is dehydrated to 1-phenyl-3-aminopyrazole.

The pyridones of formula (III) are obtained by substantially conventional methods involving alkylation, in inert organic solvents, of pyridones of general formula (V):

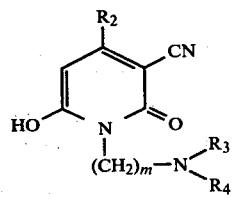

in which $R_2$, $R_3$, $R_4$ and m have the meaning as in formula (I).

Compounds (V) are obtained, for instance, for $R_2=CH_3$, $R_3=R_4=CH_3$ and for m=3, by condensation between methyl cyanoacetate, methylacetoacetate, and N,N-dimethyl-1,3-propandiamine.

Compounds (IV) are obtained by diazotization of amino-pyrazoles (II) and by successive coupling in an aqueous medium, either acid or slightly alkaline, with pyridones (V).

Advantageous results are obtained using pH values around 6.

Suitable alkylating agents for compounds (IV) and (V) are alkyl or aralkyl halides, alkyl/aryl-sulphonates and alkyl sulphates, in particular methyl and ethyl sulphates.

As inert organic solvents for the alkylation there may be used aliphatic alcohols, the aromatic, possibly halogenated, hydrocarbons (such as e.g., toluene, xylenes, chlorobenzene, o-dichlorobenzene), dimethylformamide, carbon tetrachloride, etc.

The solvent may also be the same alkylating agent used in excess.

The alkylation is usually carried out at a temperature comprised between 50° and 100° C.

Anion X does not exert any influence on the dye and may be varied, for instance, in order to improve the solubility of the dye.

Useful anions include chloride, methylsulphate, chlorozincate, etc.

Useful diazotable compounds (II) include: 1-phenyl-3-amino-pyrazole, 1-phenyl-3-amino-4-methylpyrazole, 1-(3-chlorophenyl)-3-aminopyrazole, 1-(2-chlorophenyl)-3-aminopyrazole, 1-(4-chlorophenyl)-3-aminopyrazole, 1-(4-bromophenyl)-3-aminopyrazole, 1-(3,4-dichlorophenyl)-3-aminopyrazole, 1-(2,4,5-trichlorophenyl)-3-aminopyrazole, 1-(4-methoxyphenyl)-3-aminopyrazole, 1-(3-trifluoromethylphenyl)-3-aminopyrazole, etc.

The useful coupling compounds include: pyridones (III) and (V), wherein substituents $R_2$, $R_3$, $R_4$, $R_5$ and m have the following meanings:

| | |
|---|---|
| $R_2$ is $CH_3$, $R_3$ & $R_4$ are $CH_3$, m is 2 | |
| $R_2$ is $CH_3$, $R_3$ & $R_4$ are $CH_3$, m is 3 | |
| $R_2$ is $CH_3$, $R_3$ & $R_4$ are $CH_3$, m is 4 | of formula (V) |
| $R_2$ is $C_2H_5$, $R_3$ & $R_4$ are $CH_3$, m is 3 | |
| $R_2$ is $CH_3$, $R_3$ & $R_4$ are $CH_3$, $R_5$ is $CH_3$, m is 3 | |
| $R_2$ is $CH_3$, $R_3$ & $R_4$ are $CH_3$, $R_5$ is $C_6H_5CH_2$, m is 3 | of formula (III) |

The following examples are given to illustrate this invention in more detail, are illustrative and not intended to be limiting.

EXAMPLE 1

To 1.6 g of 1-phenyl-3-amino-pyrazole dissolved in 10 g of acetic acid and 6 g of 60% sulphuric acid cooled down to 5°–10° C., there were added, gradually, 0.75 g of $NaNO_2$.

This mixture was then maintained under stirring at 5°–10° C. for 1 (one) hour, after which the excess nitrite was removed with urea and sulphamic acid. The solution of the diazo compound thus obtained was mixed with a solution of 3.6 g of methylsulphate of 1-(3,N-trimethylammonium-propyl)-3-cyano-4-methyl-6-hydroxy-2-pyridone in 100 g of water containing sodium acetate so as to keep the pH value at about 6.

The above-indicated solution of the alkylated pyridone was prepared by reacting 2.35 g of 1-(3,N-dimethylamino-propyl)-3-cyano-4-methyl-6-hydroxy-2-pyridone for 3 hours at 50°–60° C. with 8 g of dimethylsulphate. The solution thus obtained was diluted with 100 g of water as indicated above.

After 30 minutes there were added 10 g of NaCl and 1 g of $ZnCl_2$ and the mixture was then subjected to stirring for 1 (one) hour. The dye was filtered and washed with a 10% brine. After drying in an oven at 60° C., there were obtained 4.7 g of cationic dye of the following formula:

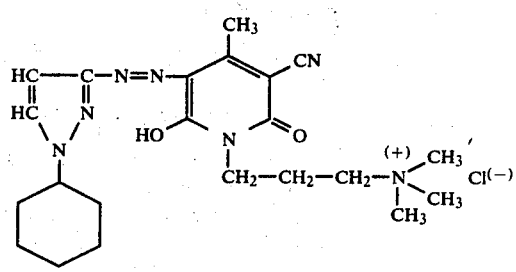

in the form of a yellow powder.

EXAMPLE 2 (DYEING)

1 g of the dye prepared according to Example 1 was kneaded with 2 g of 50% acetic acid and then dissolved in hot water up to a total volume of 5 liters. To this dyeing bath there was added 1 g of crystallized sodium acetate after which there were introduced, at 60° C., 100 g of preliminarly scoured polyacrylonitrile yarn. The temperature of the dyeing bath was slowly brought up to 100° C. and the yarn was dyed for 1 hour at boiling point.

The dyeing bath was slowly cooled down to 60° C., the yarn was rinsed with water, then soaped at 70° C. for 10 minutes with a 0.1% non-ionic detergent solution. Finally, the yarn was rinsed again with water and then dried. The dyeing obtained proved uniform and showed a bright pure yellow tinge of excellent fastnesses to light, to sublimation, to solvents and to wet treatments.

EXAMPLE 3

Following the procedures of Example 1, 1.93 g of 1-(3-chlorophenyl)-3-aminopyrazole were diazotized. The solution of the diazo-compound thus obtained was added to a solution of 2.35 g of 1-(3,N-dimethylaminopropyl)-3-cyano-4-methyl-6-hydroxy-2-pyridone in 100 g of water containing sodium acetate, so as to maintain the pH value at about 6.

After 30 minutes, the solution was filtered and washed with a 5% brine. After drying at 50° C., there were obtained 4.5 g of an intermediate compound of formula (IV):

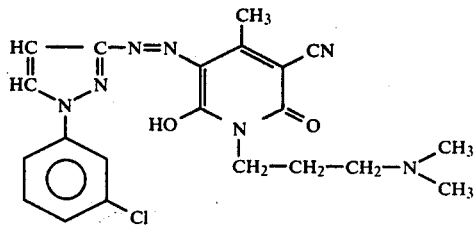

which were reacted with 15 g of dimethylsulphate at 70° C. for 4 (four) hours. This solution was poured into 100 g of water and the dye was precipitated by the addition of 10 g of NaCl and 1 g of $ZnCl_2$, keeping the whole under stirring for 1 (one) hour. Thereafter, the whole was filtered and washed with a 10% brine. After drying in an oven at 60° C., there were obtained 5.2 g of a cationic dye of the following formula:

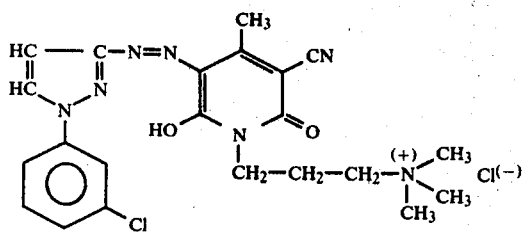

in the form of a yellow powder.

The dye, applied to polyacrylonitrile yarn according to the procedures of Example 2, gave a uniform and bright dyeing of yellow tinge which displayed excellent fastness to light, sublimation, solvents and wet treatments.

Operating analogously as in the foregoing examples, dyes were prepared and dyeings were obtained, all having the characteristics reported in the following table:

| Example | Dye | Dyeing on Polyacrylonitrile |
|---|---|---|
| 4 | | Yellow |
| 5 | | Yellow |
| 6 | | Yellow |
| 7 | | Yellow |
| 8 | | Yellow |
| 9 | | Yellow |

| Example | Dye | Dyeing on Polyacrylonitrile |
|---|---|---|
| | -continued | |
| 10 | 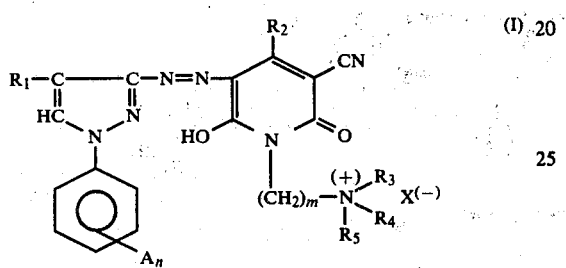 | Yellow |

We claim:

1. Hydrosoluble cationic monoazoic dyes free of sulphonic and carboxylic acid groups and having the formula (I):

(I)

in which
$R_1$ is H or $CH_3$;
$R_2$ is $CH_3$ or $C_2H_5$;
$R_3$ & $R_4$ are $CH_3$ or $C_2H_5$;
$R_5$ is $CH_3$, $C_2H_5$ or $C_6H_5CH_2$;

A is H, Cl, Br, alkyl or alkoxyl groups having up to 2 carbon atoms or $CF_3$;
m is a whole number from 1 to 4;
n is a whole number from 1 to 3; and
X represents a monovalent anion.

2. The new compound of formula

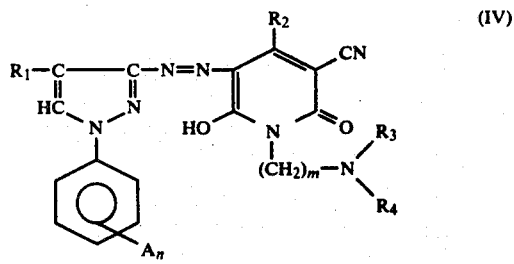

(IV)

in which $R_1$, $R_2$, $R_3$, $R_4$, A, n and m have the same meanings as in formula (I) of claim 1.

* * * * *